United States Patent
Kadosh et al.

(10) Patent No.: US 9,571,380 B2
(45) Date of Patent: Feb. 14, 2017

(54) MULTI-STAGE INTERCONNECT NETWORK IN A PARALLEL PROCESSING NETWORK DEVICE

(71) Applicant: Marvell World Trade Ltd., St. Michael (BB)

(72) Inventors: Aviran Kadosh, D.N. Misgav (IL); Rami Zemach, Givat Shapira (IL)

(73) Assignee: Marvell World Trade Ltd., St. Michael (BB)

( * ) Notice: Subject to any disclaimer, the term of this patent is extended or adjusted under 35 U.S.C. 154(b) by 157 days.

(21) Appl. No.: 14/482,980

(22) Filed: Sep. 10, 2014

(65) Prior Publication Data

US 2015/0071079 A1 Mar. 12, 2015

Related U.S. Application Data

(60) Provisional application No. 61/875,992, filed on Sep. 10, 2013, provisional application No. 61/917,206, filed on Dec. 17, 2013.

(51) Int. Cl.
*H04L 12/26* (2006.01)
*H04L 12/715* (2013.01)
(Continued)

(52) U.S. Cl.
CPC ............ *H04L 45/04* (2013.01); *H04L 47/122* (2013.01); *H04L 49/109* (2013.01); *H04L 49/1515* (2013.01); *H04L 49/505* (2013.01)

(58) Field of Classification Search
None
See application file for complete search history.

(56) References Cited

U.S. PATENT DOCUMENTS 7,924,848 B2 * 4/2011 Biran .................... H04L 69/16
370/395.52
7,924,860 B1 4/2011 Frailong et al.
(Continued)

FOREIGN PATENT DOCUMENTS

WO   WO-99/07180 A2   2/1999

OTHER PUBLICATIONS

U.S. Appl. No. 14/574,088, Levy et al., "Increasing Packet Processing Rate in a Network Device," filed Dec. 17, 2014.
(Continued)

*Primary Examiner* — Otis L Thompson, Jr.

(57) ABSTRACT

A packet is received at a packet processing element, among a plurality of like packet processing elements, of a network device, and request specifying a processing operation to be performed with respect to the packet by an accelerator engine functionally different from the plurality of like packet processing elements is generated by the packet processing element. The request is transmitted to an interconnect network that includes a plurality of interconnect units arranged in stages. A path through the interconnect network is selected among a plurality of candidate paths, wherein no path of the candidate paths includes multiple interconnect units within a same stage of the interconnect network. The request is then transmitted via the determined path to a particular accelerator engine among multiple candidate accelerator engines configured to perform the processing operation. The processing operation is then performed by the particular accelerator engine.

20 Claims, 7 Drawing Sheets

(51) Int. Cl.
*H04L 12/803* (2013.01)
*H04L 12/933* (2013.01)
*H04L 12/931* (2013.01)

(56) References Cited

U.S. PATENT DOCUMENTS

| | | | |
|---|---|---|---|
| 8,111,690 B2 | 2/2012 | Hussain et al. | |
| 2003/0031172 A1* | 2/2003 | Grinfeld | G06Q 40/04 370/389 |
| 2008/0114887 A1 | 5/2008 | Bryers et al. | |
| 2010/0293312 A1 | 11/2010 | Sonnier et al. | |
| 2012/0011351 A1* | 1/2012 | Mundra | G06F 21/72 713/1 |
| 2012/0177047 A1 | 7/2012 | Roitshtein | |
| 2014/0006757 A1* | 1/2014 | Assarpour | G06F 9/38 712/226 |
| 2014/0122560 A1* | 5/2014 | Ramey | G06F 15/17312 709/201 |
| 2014/0169378 A1 | 6/2014 | Shumsky et al. | |
| 2014/0177470 A1 | 6/2014 | Roitshtein et al. | |
| 2014/0192815 A1 | 7/2014 | Shumsky et al. | |
| 2015/0110113 A1 | 4/2015 | Levy et al. | |
| 2015/0110114 A1 | 4/2015 | Wohlgemuth et al. | |
| 2015/0113190 A1 | 4/2015 | Wohlgemuth et al. | |
| 2015/0172188 A1 | 6/2015 | Levy et al. | |

OTHER PUBLICATIONS

U.S. Appl. No. 14/610,834, Levy et al., "Packet Distribution with Prefetch in a Parallel Processing Network Device," filed Jan. 30, 2015.
Shpiner et al., "Reducing the Reordering Delay in Multi-Core Network Processors," Technical Report TR12-01, Comnet, Technion, Israel.
U.S. Appl. No. 14/092,521, filed Nov. 27, 2013.
International Search Report and Written Opinion in PCT Application No. IB2014/002656, dated Mar. 18, 2015 (11 pages).
Zhang, et al., "Performance Prediction and Evaluation of Parallel Processing on a NUMA Multiprocessor," *IEEE Transactions on Software Engineering*, vol. 17, No. 10, pp. 1059-1068 (Oct. 1991).

\* cited by examiner

MULTI-STAGE INTERCONNECT NETWORK IN A PARALLEL PROCESSING NETWORK DEVICE

CROSS-REFERENCE TO RELATED APPLICATION

This disclosure claims the benefit of U.S. Provisional Patent Application No. 61/875,992, entitled "Core to Engines Interconnect" and filed on Sep. 10, 2013, and U.S. Provisional Patent Application No. 61/917,206, entitled "NG-PP Interconnect" and filed on Dec. 17, 2013, the disclosures of which are hereby incorporated by reference herein in their entireties.

FIELD OF THE DISCLOSURE

The present disclosure relates generally to an interconnect network in a parallel processing system, and more particularly, to network devices such as switches, bridges, routers, etc., that employ such an interconnect network to interconnect various components of a parallel processing system for processing network packets.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, bridges, routers, etc., employ multiple packet processing elements to simultaneously process multiple packets to provide high throughput. For example, a network device may utilize parallel packet processing in which multiple packet processing elements simultaneously and in parallel perform processing of different packets. In such network devices, the packet processing elements sometimes employ accelerator engines, which are external to the packet processors, for performing certain processing operations, such as processing intensive operations.

SUMMARY

In an embodiment, a method comprises receiving a packet at a packet processing element, among a plurality of like packet processing elements, of a network device. The method further comprises generating, by the packet processing element, a request specifying a processing operation to be performed with respect to the packet by an accelerator engine functionally different from the plurality of like packet processing elements, and transmitting the request from the packet processing element to an interconnect network, the interconnect network including a plurality of interconnect units arranged in stages. The method further still comprises determining a path through the interconnect network, wherein the path is selected among a plurality of candidate paths, wherein no path of the candidate paths includes multiple interconnect units within a same stage of the interconnect network, and transmitting the request, via the determined path, to a particular accelerator engine among multiple candidate accelerator engines configured to perform the processing operation. The method additionally comprises performing the processing operation by the particular accelerator engine.

In other embodiments, the method includes any suitable combination of one or more of the following features.

Transmitting the request to the interconnect network comprises transmitting the request to a first interconnect unit of the plurality of interconnect units, wherein the first interconnect unit is in a first stage of the interconnect network.

Determining the path through the interconnect network includes selecting the particular accelerator engine by the first interconnect unit, wherein the particular accelerator engines is coupled to an interconnect unit in a second stage of the interconnect network.

Selecting the particular accelerator engine comprises selecting the particular accelerator engine without communicating with the other interconnect units in the first stage.

Selecting the particular accelerator engine comprises selecting the particular accelerator engine based at least in part on a number of requests previously sent by the first interconnect unit to respective accelerator engines of the candidate accelerator engines.

The method further comprises generating, at respective second interconnect units, the second interconnect units in the second stage of the interconnect network, flow control information indicative of one or more of (i) respective loads of one or more candidate accelerator engines coupled to the respective second interconnect units and (ii) congestion on respective links between the first interconnect unit and the second interconnect units, transmitting the flow control information from the second interconnect units to the first interconnect unit, receiving the flow control information at the first interconnect unit, and selecting the particular accelerator engine at the first interconnect unit further based on the received flow control information.

Generating the flow control information indicative of respective loads of one or more candidate accelerator engines coupled to the respective second interconnect units comprises generating the flow control information based on respective numbers of requests sent to the respective candidate accelerator engines by interconnect units in the first stage of the interconnect network.

Generating flow control information indicative of congestion on respective links between the first interconnect unit and the respective second interconnect units comprises generating the flow control information based on respective fill levels of input queues of the second interconnect units, the input queues coupled to the respective links between the first interconnect unit and the second interconnect unit.

The flow control information corresponding to a candidate accelerator engine indicates one of four states including (i) on state, (ii) light load state, (iii) heavy loaded state, and (iv) blocked state.

Selecting the particular accelerator engine includes eliminating a candidate accelerator engine from consideration if the flow control information corresponding to the candidate accelerator engine indicates that the candidate accelerator engine is in the blocked state.

Selecting the particular accelerator engine includes eliminating from consideration one or more candidate accelerator engines coupled to the second interconnect unit if the flow control information indicates that the link between the first interconnect unit and the second interconnect unit is in the blocked state.

The flow control information is first flow control information.

The method further comprises generating, at the first interconnect unit, second flow control information based on first flow control information, wherein the second flow control information is indicative of overall load of the candidate accelerator engines, transmitting the second flow control information from the first interconnect unit to packet processing elements coupled to the first interconnect unit, receiving the second flow control information by the packet processing elements coupled to the first interconnect unit, and adjusting transmission of requests by the packet processing elements to the first interconnect unit based on the second flow control information.

In another embodiment, a network device comprises a plurality of packet processing elements configured to process packets received from a network, the packet processing elements configured to selectively engage accelerator engine for performing certain processing operations with respect to the packets. The network device further comprises a plurality of accelerator engines configured to perform certain processing operations not performed by the packet processing elements, wherein two or more accelerator engines are configured to perform a processing operation of a same type. The network device further still comprises a multi-stage interconnect network configured to route requests from the packet processing elements to the external processing engines, the multi-stage interconnect network including at least two interconnect stages, the interconnect stages respectively including a plurality of interconnect units, wherein the interconnect units of a given stage are configured to route the requests to the interconnect units of neighboring stages and not to route the requests to the interconnect units of the given stage.

In other embodiments, the apparatus includes any suitable combination of one or more of the following features.

Each of at least some of the packet processing elements is configured to perform processing to completion of packets using computer readable instructions stored in a non-transitory memory.

The processing operations that the accelerator engines are configured to perform include one or more of (i) forwarding lookup operations, (ii) policy control lookup operations, and (iii) cyclic redundancy check calculations.

Respective interconnect units of the first stage are coupled to respective subsets of packet processing elements of the plurality of packet processing elements.

Respective interconnect units of the second state are coupled to respective subsets of accelerator engines of the plurality accelerator engines.

The interconnect units in the first stage are coupled to the interconnect units in the second stage.

A first interconnect unit of the first stage is configured to receive, from a packet processing element coupled to the first interconnect unit, a request specifying a particular processing operation, select an accelerator engine among a group of candidate accelerator engines configured to perform the particular processing operation, and transmit the request to a second interconnect unit in the second stage, the second interconnect unit coupled to the selected accelerator engine.

The first interconnect unit is configured to select the particular accelerator engine without communicating with the other interconnect units in the first stage.

The first interconnect unit is configured to select the particular accelerator engine based at least in part on a number of requests previously sent by the first interconnect unit to respective accelerator engines of the candidate accelerator engines.

Respective second interconnect units in the second stage of the interconnect network are configured to generate flow control information indicative of one or more of (i) respective loads of one or more candidate accelerator engines coupled to the respective second interconnect units and (ii) congestion on respective links between the first interconnect unit and the second interconnect units, and transmit the flow control information from the second interconnect units to the first interconnect unit.

The first interconnect unit is further configured to receive the flow control information from the respective second interconnect units, and select the particular accelerator engine further based on the received flow control information.

The flow control information is first flow control information.

The first interconnect unit is further configured to generate second flow control information based on the first flow control information, wherein the second flow control information is indicative of overall load of the candidate accelerator engines, and transmit the second flow control information to packet processing elements coupled to the first interconnect unit.

DETAILED DESCRIPTION

Figure 1:
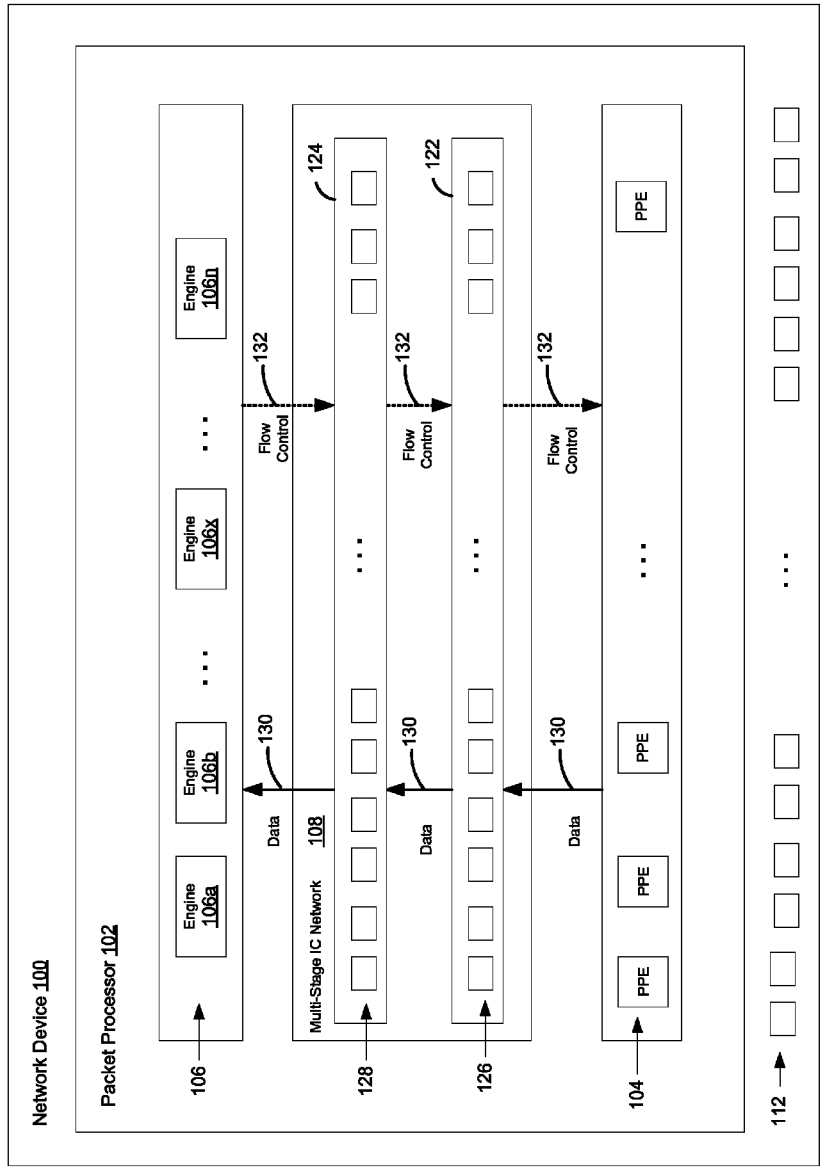
FIG. 1 is a simplified block diagram of an example network device configured to process packets using a plurality of packet processing elements and a plurality of accelerator engines interconnected by a multi-stage interconnect network, according to an embodiment.

FIG. 1 is a simplified block diagram of an example network device 100 configured to process packets using a plurality of packet processing elements and a plurality of accelerator engines interconnected by a multi-stage interconnect network, according to an embodiment. The network device 100 is generally a computer networking device that connects two or more computer systems, network segments, subnets, and so on. For example, the network device 100 is a switch, in one embodiment. It is noted, however, that the network device 100 is not necessarily limited to a particular protocol layer or to a particular networking technology (e.g., Ethernet). For instance, in other embodiments, the network device 100 is a bridge, a router, a VPN concentrator, etc.

The network device 100 includes a network processor (or a packet processor) 102, and the packet processor 102, in turn, includes a plurality of packet processing elements (PPEs), or packet processing nodes (PPNs), 104, a plurality of external processing engines 106, and an interconnect network 108 coupled between the PPEs 104 and the external processing engines 106. In an embodiment, the PPEs 104 are configured to offload processing tasks to the external processing engines 106 via the interconnect network 108.

The network device 100 also includes a plurality of network ports 112 coupled to the packet processor 102, and each of the network ports 112 is coupled via a respective communication link to a communication network and/or to another suitable network device within a communication network. Generally speaking, the packet processor 102 is configured to process packets received via ingress ports 112, to determine respective egress ports 112 via which the packets are to be transmitted, and to transmit the packets via the determined egress ports 112. In some embodiments, the packet processor 102 processes packet descriptors associated with the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a memory associated with the network device 100. For ease of explanation, the term "packet" herein is used to refer to a packet itself or to a packet descriptor associated with the packet. Further, as used herein, the term "packet processing elements (PPEs)" and the term "packet processing nodes (PPNs)" are used interchangeably to refer to processing units configured to perform packet processing operations on packets received by the network device 100.

In an embodiment, the packet processor 102 is configured to distribute processing of received packets to the PPEs 104. The PPEs 104 are configured to concurrently, in parallel, perform processing of respective packets. According to an embodiment, the PPEs 104 are configured to process packets using computer readable instructions stored in a non-transitory memory (not shown), In some embodiments, each PPE 104 is configured to perform two or more processing operations on a packet. For example, in an embodiment, each PPE 104 is configured to perform all necessary processing (run to completion processing, for example) of a packet. Each external processing engine 106 is dedicated to performing one or several particular, typically processing intensive, operations, in an embodiment. As just an example, in an example embodiment, a first external processing engine 106 (e.g., the engine 106a) is a forwarding lookup engine, a second external processing engine 106 (e.g., the engine 106x) is a policy lookup engine, a third external processing engine 106 (e.g., the engine 106n) is a cyclic redundancy check (CRC) calculation engine, etc. During processing of the packets, the PPEs 104 selectively engage the external processing engines 106 for performing the particular processing operations on the packets.

In some embodiments, the PPEs 104 and/or the accelerator engines 106 are arranged in one or more pipelines, wherein each element (e.g., a processing element executing computer readable instructions, a hardware accelerator engine, etc.) of the pipeline performs one or more processing operations on a packet and passes the packet and a processing context for the packet to the following element in the pipeline. The following processing element of the pipeline then continues processing of the packet based on the processing context associated with the packet. In such embodiments, different elements of a pipeline can be processing different packets at a given time.

In an embodiment, during processing of the packets, the PPEs 104 are configured to selectively engage the external processing engines 106 for performing the particular processing operations on the packets. In at least some embodiments, the PPEs 104 are not configured to perform the particular processing operations that the external processing engines 106 are configured to perform. The particular processing operations that the external processing engines 106 are configured to perform are typically highly resource intensive and/or would require a relatively longer time to be performed if the operations were performed using a more generalized processor, such as a PPE 104, in at least some embodiments and/or scenarios. In at least some embodiments and scenarios, it would take significantly longer (e.g., twice as long, ten times as long, 100 times as long, etc.) for a PPE 104 to perform a processing operation that an external processing engine 106 is configured to perform. As such, the external processing engines 106 assist PPEs 104 by accelerating at least some processing operations that would take a long time to be performed by the PPEs 104, in at least some embodiments and/or scenarios. Accordingly, the external processing engines 106 are sometimes referred to herein as "accelerator engines."

To engage an accelerator engine 106 to perform a particular processing operation with respect to a packet, a PPE 104 generates a request that specifies the type of the processing operation being requested (e.g., a forwarding lookup operation) and includes data, such as data extracted from the packet (e.g., from a header of the packet, such as the destination MAC address extracted from a header of the packet), data extracted from a payload of the packet, or data otherwise associated with the packet, such as generated for the packet by the network device 100 and/or other information needed for performing the processing operation. The PPE 104 then transmits the request to the interconnect network 108, which directs the request to an appropriate accelerator engine 106 for performing the processing operation, in an embodiment. After the processing operation is performed by the accelerator engine 106, the result of the processing operation is routed back to the PPE 104, in an embodiment. In an embodiment, the interconnect network 108 also provides return paths from the accelerator engines 106 to the PPEs 104 to route responses to the requests, wherein the responses include results of processing operations specified by the requests. In another embodiment, the network device 100 includes a separate interconnect network to provide the return paths from the accelerator engines 106 to the PPEs 104 to route the results of processing operations back to the PPEs 104. An example interconnect network for routing results of processing operations from the accelerator engines 106 to the PPEs 104 is described in more detail below with respect to FIG. 6.

The PPEs 104 are configured to utilize the results of the processing operations performed by the external processing engines 106 for further processing of the packets, for example to determine certain actions, such as forwarding actions, policy control actions, etc., to be taken with respect to the packets, in an embodiment. For example, a PPE 104 uses results of a forwarding database (FDB) lookup by an engine 106 to indicate a particular port to which a packet is to be forwarded, in an embodiment. As another example, a PPE 104 uses results of a lowest prefix match engine (LPM) lookup by an engine 106 to change a next hop address in the packet, in an embodiment.

In some embodiments, the PPEs 104 are arranged in packet processing clusters (PPCs). Each PPC includes a controller configured to transfer requests from the PPEs 104 included in the cluster to the interconnect network 108. The processing controller is also configured to forward results of the requested processing operation from the interconnect network 108 to the PPEs 104 included in a cluster, in an embodiment. In effect, from the point of view of the interconnect network 108, each PPC is a single processing entity that transmits requests to the interconnect network 108 and/or receives results of the requested processing operations from the interconnect network 108, in an embodiment. As used herein, the terms packet processing elements and packet processing clusters are used interchangeably to refer to processing elements that transmit requests to accelerator engines via an interconnect network and/or receive processing operation results from accelerator engines via an interconnect network.

In an embodiment, the multi-stage interconnect network 108 includes a plurality of interconnect units arranged in stages, including a first stage 122 and a second stage 124. The first stage 122 includes a plurality of first stage units 126, each first stage unit 126 coupled to one or more of the PPEs 104. The second stage 124 includes a plurality of second stage units 128, each second stage unit 128 coupled to one or more of the accelerator engines 106. For example, each first stage unit 126 is coupled to a respective subset of the PPEs 104, and each of the second stage units 128 is coupled to a respective subset of the accelerator engines 106, in an embodiment. In an embodiment, each first stage unit 126 is coupled to one or more of the second stage units 128. For example, each first stage unit 126 is coupled to each second stage unit 128, in an embodiment. For clarity of illustration, the links between the PPEs 104 and the first stage units 126, the links between the first stage units 126 and the second stage units 128, and the links between the second stage units 128 and the accelerator engines 106 are not shown in FIG. 1.

The network device 100 includes any suitable number of PPEs 104 and any suitable number of accelerator engines 106, in various embodiments. In at least some embodiments, the number of the PPEs 104 is different from the number of accelerator engines 106. In such embodiments, the interconnect network 108 is asymmetric in that the number of source devices that provide inputs to the network 108 is different from the number of target devices that receive outputs from the interconnect network 108. As just an example, in one embodiment, the network device 100 includes 100 PPEs 104 and 60 accelerator engines 106. In another embodiment, the network device 100 includes other suitable number of PPEs 104 and/or accelerator engines 106. In some other embodiments, the network device 100 includes an equal number of PPEs 104 and accelerator engines 106. In such embodiments, the interconnect network 108 is a symmetric network that interconnects an equal number of source devices and target devices.

In an embodiment, multiple ones of the accelerator engines 106 are configured to perform processing operations of a certain type. For example multiple ones of the accelerator engines 106 are configured to perform a forwarding lookup operation, multiples ones of the accelerator engines 106 are configured to perform a policy lookup operation, multiple ones of the accelerator engines 106 are configured to perform a CRC calculation, etc., in an embodiment. In an embodiment, the interconnect network 108 is configured receive, form the PPEs 104, processing requests that specify processing operations of certain types and to route the requests to the accelerator engines 106 configured to perform the processing operations of the certain types. In an embodiment, when the interconnect network 108 receives a processing request specifying a processing operation of a certain type, the interconnect network 108 selects a path though the interconnect network 108 for routing the request to an accelerator engine 106 that is configured to perform the specified processing operation. The interconnect network 108 then routes the request via the selected path to the accelerator engine 106 configured to perform the processing operation. In this manner, the interconnect network 108 abstracts the multiple accelerator engines 106 from the PPEs 104. In other words, form the point of view of the PPEs 104, the multiple accelerator engines 106 configured to perform a processing operation of a certain type are a single entity configured to perform the processing operation of the certain type, in an embodiment.

Referring still to FIG. 1, although the multi-stage interconnect network 108 is illustrated as having two stages, with each stage including a plurality of interconnect units, the multi-stage interconnect network 108 includes other suitable numbers (e.g., 3, 4, 5, etc.) stages, with each stage having one or more interconnect units, in other embodiments. In an embodiment, each interconnect unit of a particular stage of the interconnect network 108 is not coupled to and/or is not configured to route data to the other interconnect units of the particular stage. In an embodiment, an interconnect unit of a particular stage of the interconnect network 108 is coupled to one or more of the interconnect units of a neighboring stage and is configured to route requests to the one or more of the interconnect units of the neighboring stage. On the other hand, interconnect units of a particular stage are not coupled to other interconnect units of the particular stage and/or are note configured to route requests to other interconnect units of the particular stage, in an embodiment.

As discussed above, in an embodiment, when the interconnect network 108 receives a processing request specifying a processing operation from a PPE 104, the interconnect network 108 selects a path though the interconnect network 108 for routing the request to an accelerator engine 106 that is configured to perform the specified processing operation. Because multiple accelerator engines 106 may be configured to perform the specified processing operation, multiple paths through the interconnect network 108 may be available to reach a particular accelerator engine 106 that is configured to perform the processing operation. In an embodiment, an interconnect unit that receives a request determines an interconnect unit in the following stage to which to route the request. In an embodiment, an interconnect unit in a particular stage makes this determination without communicating with other interconnect units in the particular stage. Nonetheless, when making the determination, the interconnect unit in a particular stage takes into account traffic routed through the interconnect network 108 by other interconnect units of the particular stage. For example, the interconnect unit makes the determination, at least in part, based on flow control (FC) information that the interconnect unit receives from interconnect units of the following stage. The FC information is indicative of the amount of traffic routed to the interconnect units of the following stage by all of the interconnect units of the particular stage, in an embodiment. Additionally, FC information is indicative of congestion on various links within the interconnect network 108 and/or various links that couple the interconnect network 108 to the PPEs 104 and the accelerator engines 106.

Generally speaking, in an embodiment data associated with requests flows through the interconnect network 108 in the direction from the PPEs 104 to the accelerator engines 106, as indicated in FIG. 1 by "data" arrows 130. Conversely, FC information flows through the interconnect network 108 in the direction from the accelerator engines 106 to the PPEs 104, i.e., in the direction opposite to the direction of the data flow in the interconnect network 108, as indicated in FIG. 1 by "flow control" arrows 132. Interconnect units use the FC information to adjust path selection, in an embodiment. As such, downstream interconnect units receive FC information from upstream interconnect units and use this FC information to adjust transmission of data (e.g., requests) to the upstream interconnect units. For example, paths that include overloaded interconnect units and/or paths that lead to overloaded accelerator engines 106 and/or paths that include heavily congested links are eliminated from consideration for path selection for data transmission to the interconnect units, or the amount of data (e.g., the number of requests) for which these paths are selected is reduced, in various embodiments and/or scenarios.

As will be explained in more detail below, these and other flow control mechanisms used by the interconnect network 108 allow the interconnect network 108 distribute traffic through the interconnect network 108 in a balanced manner and to also provide a balanced distribution of requests among groups of accelerator engines 106 that are configured to perform processing operations indicated by the requests, while also minimizing or eliminating loss of requests that traverse the interconnect network 108. In at least some embodiments, such flow control mechanisms allow the interconnect network 108 to achieve this balanced distribution without communication between interconnect units of a particular stage, allowing for an efficient and scalable interconnect system.

As a more specific example, in the two-stage interconnect network 108 illustrated in FIG. 1, a first stage unit 126 receives a request specifying a processing operation from the PPE 104, and selects an accelerator engine 106 from a group of candidate accelerator engines 106 configured to perform the processing operation, in an embodiment. The first stage unit 126 then determines which second stage interconnect unit 128 is coupled to the selected accelerator engine 106 and transmits the request, along with an indication of the selected accelerator engine 106 to which to direct the request, to the second stage unit 128 that is coupled to the selected accelerator engine 106. The second stage unit 128 receives the request from the first stage unit 126 and determines, based on the indication, to which accelerator engine 106 to forward the request, and transmits the request to the accelerator engine 106 for performing the processing operation specified by the request.

In an embodiment, first stage units 126 select the accelerator engines 106 to which to route the requests without communicating with the other first stage units 126. Nonetheless, when making the selection, a first stage unit 126 takes into account overall request traffic sent to each of the candidate accelerator engines 106 by all of the first stage units 126, in an embodiment. In an embodiment, the first stage unit 126 makes the selection based, at least in part, on flow control (FC) information that the first stage unit 126 receives from the second stage interconnect units 128. The FC information that the first stage unit 126 receives from a second stage unit 128 is indicative of the amount of traffic received by the second stage unit 128 directed to the accelerator engines 106 coupled to the second stage unit 128, in an embodiment. Additionally, in an embodiment, FC information propagated through the interconnect network 108 includes link state information, indicative of congestion on links between the accelerator engines 106 and the second stage units 128, links between the second stage units 128 and the first stage units 126, and links between the first stage units 126 and the PPEs 104 is propagated through the interconnect network 108. In an embodiment, path selections in the interconnect network 108 are further based on the link state information.

Figure 2:
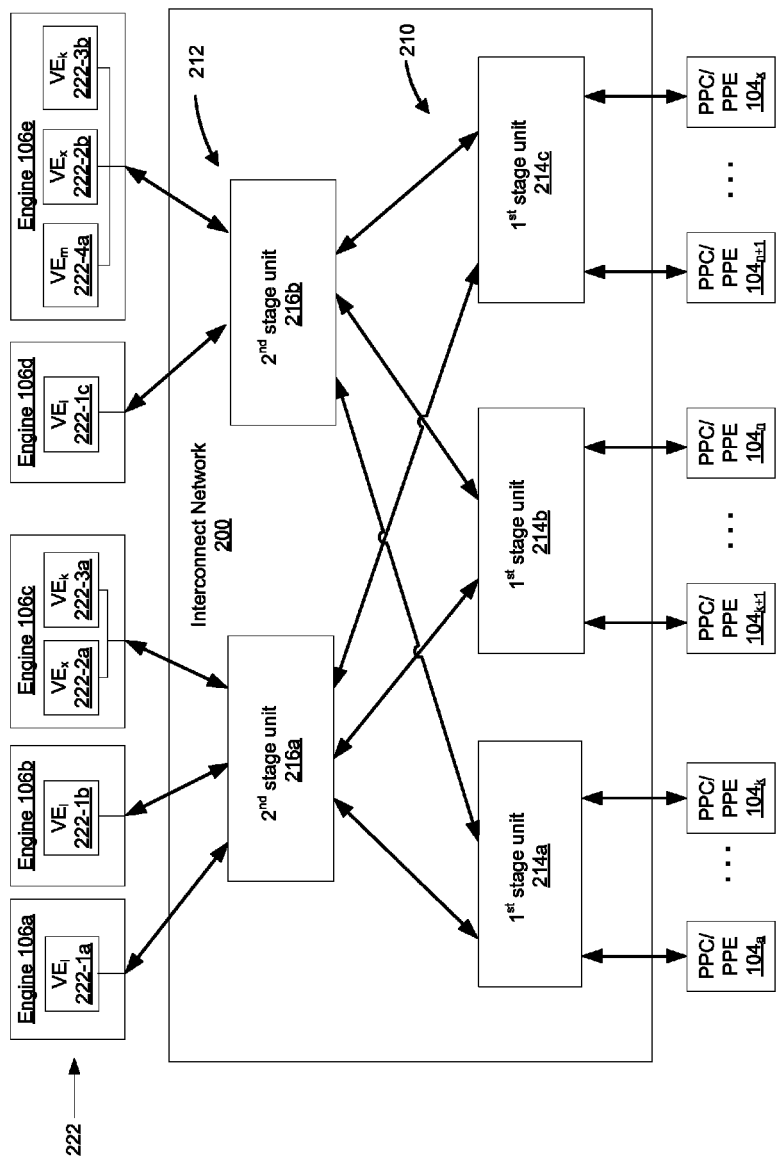
FIG. 2 is a block diagram of a multi-stage interconnect network suitable for use with the network device of FIG. 1, according to an embodiment.

FIG. 2 is a block diagram of an interconnect network 200 suitable for use as the interconnect network 108, according to an embodiment. The interconnect network 200 is a two-stage interconnect unit having a first, or ingress, stage 210 and a second, or egress, stage 212. The first stage 210 includes a plurality of first stage units 214, and the second stage 212 includes a plurality of second stage units 216. Referring to FIGS. 1 and 2, in an embodiment, the first stage units 214 are suitable for use as the first stage units 126 (FIG. 1) and the second stage units 216 are suitable for use as the second stage units 128 (FIG. 1). For ease of explanation, the interconnect network 200 of FIG. 2 includes three first stage units 214 and two second stage units 216. In other embodiments, the interconnect network 200 includes any other suitable number of first stage units 214 and/or any other suitable number of second stage units 216.

In an embodiment, each of the first stage units 214 is coupled to a subset of PPEs 104. For example, each of the first stage unit 214 is coupled to a respective subset of PPEs 104, in an embodiment. In the illustrated embodiment, the first stage unit 214a is coupled to the PPEs $104_a$-$104_k$, the first stage unit 214b is coupled to the PPEs $104_{k+1}$-$104_n$, and the first stage unit 214c is coupled to the PPEs $104_{n+1}$-$104_x$. Similarly, each of the second stage units 216 is coupled to a respective subset of accelerator engines 106, in an embodiment. In the illustrated embodiment, the second stage unit 216a is coupled to the accelerator engines 106a, 106b and 106c, and the second stage unit 216b is coupled to the accelerator engines 106d and 106e. Each of the accelerator engines 106 is configured to perform one or several processing operation types, and multiple ones of the accelerator engines 106 can be configured to perform a same processing operation type, in an embodiment. In FIG. 2, each of the accelerator engines 106 includes one or several virtual engines (VE) 222. A virtual engine (VE) within an accelerator engine 106 represents a processing operation type that the accelerator engine 106 is configured to perform. In the illustrated embodiment, each of the accelerator engines 106a, 106b and 106e includes a respective instance of $VE_i$ 222-1. Each of the accelerator engines 106c and 106e includes a respective instance of $VE_x$ 222-2, and a respective instance of $VE_k$ 222-3. The accelerator engine 106e additionally includes an instance of $VE_m$ 222-4. VEs that are referenced with a same subscript represent a same processing operation, and each VE referenced with a same subscript is referred to herein as an instance of the VE. As just an example, instances of $VE_i$ 222-1 (i.e., $VE_i$ 222-1a, $VE_i$ 222-1b and $VE_i$ 222-1c) represent a forwarding lookup operation. Each instance of $VE_i$ 222-1 includes an interface to a forwarding table in a memory (not shown) and is configured to access the forwarding table to obtain forwarding information for a packet, such as a port 112 to which the packet should be set for transmission, for example, in this embodiment. Similarly, in an embodiment, instances of $VE_x$ 222-2 (i.e., $VE_x$ 222-2a and $VE_i$ 222-2b) represent, for example, a policy control lookup operation. Each instance of $VE_x$ 222-2 includes an interface to a policy control table in a memory (not shown), and is configured to access the policy control table to determine an action that should be taken with respect to a packet, in this embodiment.

In operation, a first stage unit 214 (e.g., the first stage unit 214a) receives a request specifying a processing operation from a PPE 104 (e.g., the PPE 104a) and selects a path through the interconnect network 200 via which to transfer the request to an accelerator engine 106 that is configured to perform the specified processing operation. Because multiple accelerator engines 106 may be configured to perform a same specified processing operation, multiple candidate paths through the interconnect network 200 may be available to reach a particular accelerator engine 106 that is configured to perform the processing operation. As an example, if the specified processing operation corresponds to the processing operation represented by the $VE_i$ 222-1, then there are three candidate paths through the interconnect network 200 via which the request 213 can be routed: a first path that leads to the $VE_i$ 222-1a via the second stage unit 216a, a second path that leads to the $VE_i$ 222-1b via the second stage unit 216a, and a third path that leads to the $VE_i$ 222-1c via the second stage unit 216b. The first stage unit 214a selects a path among the first, the second and the third paths.

In an embodiment, the first stage unit 214 selects a particular path, of a plurality of candidate paths, via which to route a received request based on one or more of (i) the amount of data (e.g., the number of requests) that the first stage unit 214 has previously sent via to each of the candidate paths, (ii) FC information that the first stage unit 214 receives from the second stage units 216, and (iii) a bandwidth of each accelerator engine 106 configured to perform the processing operation. In an embodiment, the first stage unit 214 selects a path that leads to an instance $VE_i$ that satisfies:

$$\min\left\{\frac{1}{w_i} Cnt_i(VE) \cdot (fc(i) + 1) w_{fc}\right\} \quad \text{Equation 1}$$

where $1/w_1$ is the bandwidth of instance $VE_i$, $fc(i)$ is the flow control state corresponding to the instance $VE_i$, $w_{fc}$ is the flow control state of the link that connects the first stage unit 214 to the second stage unit 216 that is coupled to the intake $VE_i$, $Cnt_i(VE)$ is the amount of data previously sent via the path to the instance $VE_i$ by the first stage unit 214.

In an embodiment, upon selecting the path, the first stage unit 214 associates the path with the request and sends the request to the second stage unit 216 included in the path. The second stage unit 216 receives the request from the first stage unit 214 and forwards the request to the selected accelerator engine 106 that is configured to perform the specified processing operation, in an embodiment.

In an embodiment, each candidate path for routing a request through the interconnect network 200 includes only one interconnect unit in each stage. For example, in an embodiment, only one first stage unit 214 and only one second stage unit 216 is included in each candidate path. A first stage unit 214 makes path selection decisions to select paths via which to route requests without communicating with the other first stage units 214, in an embodiment. For example, the first stage unit 214 does not receive, from other first stage units 214, information indicative of load that a particular VE instance may experience due to path selections made by the other first stage units 214, in an embodiment. The first stage unit 214 nonetheless makes the path selection decisions based, at least in part, on overall load experienced by VE instances due to path selections made by each of the first stage units 214, in an embodiment. In an embodiment, the first stage units 214 make path selection decisions based, at least in part, on flow control information that the first stage units 214 receive from the second stage units 216. Flow control information that a first stage unit 114 receives from a second stage unit 216 includes information indicative of load experience by the VE instances coupled to the second stage units 216. Additionally, or alternatively, flow control information that a first stage unit 214 receives from a second stage unit 216 includes information indicative on congestion on links between the first stage unit 214 and the second stage unit 216.

The first stage unit utilizes flow control information to adjust the path selection decision process, in an embodiment. For example, if flow control information that the first stage unit 214 receives from a second stage unit 216 indicates that a particular VE instance coupled to the second stage unit 216 experiences a high level of load, the first stage unit 214 decreases the number of requests that the first stage unit 214 sends to the particular VE instance, or temporarily eliminates the path that leads to the particular VE instance from consideration when making path selections, in an embodiment. Similarly, if flow control information that the first stage unit 214 receives from a second stage unit 216 indicates that a particular link between the first stage unit 214 and the second stage unit 216 is highly congested, the first stage unit 214 decreases the number of requests sent via the path that includes the particular link, or temporarily eliminates the path that includes the particular link from consideration when making path selections, in an embodiment.

In some embodiments, the first stage units 214 are also configured to propagate flow control to the PPEs 104 coupled to the first stage units 214. For example, if an interconnect unit 214 determines, based on flow control information that the first stage unit 214 receives from the second stage units 216, that all instances of a particular VE are blocked, the first stage unit 214 transmits flow control information to the PPEs 104 coupled to the first stage units 214 indicating to the PPEs 104 that the PPEs 104 should temporarily stop sending requests specifying the particular processing operation represented by the VEs. These and other flow control mechanisms employed by the first stage units 214 and the second stage units 216 of the interconnect network 200 are described below with respect to FIG. 3 and FIG. 4.

Figure 3:
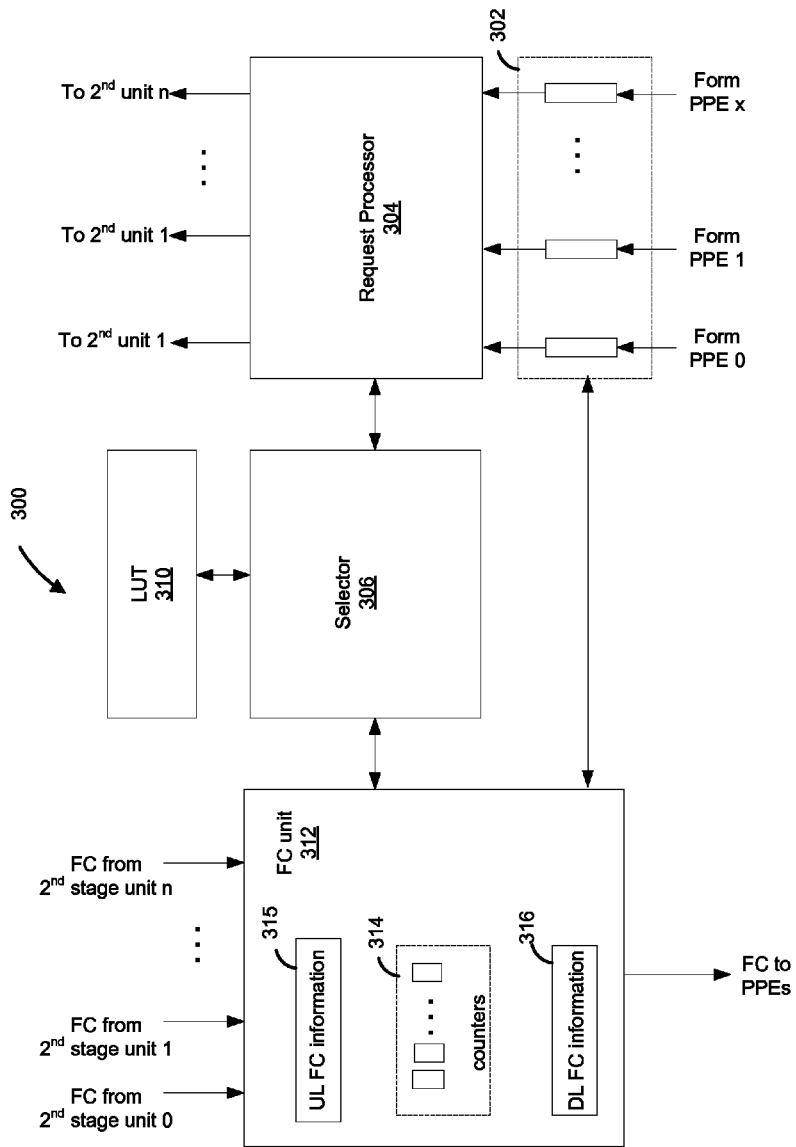
FIG. 3 is a block diagram of an example first stage unit suitable for use as a first stage unit in the interconnect network of FIG. 2, according to an embodiment.

FIG. 3 is a block diagram of a first stage unit 300 suitable for use as any of the first stage units 214 of FIG. 2 or any of the first stage units 122 of FIG. 1, according to an embodiment. For illustrative purposes, the example first stage unit 300 is described below in conjunction with FIG. 2. In other embodiments, however, the first stage unit 300 is utilized in interconnect networks other than the interconnect network 200 of FIG. 2. Similarly, the interconnect network 200 of FIG. 2 includes first stage units different from the first stage unit 300, in some embodiments.

In an embodiment, the first stage unit 300 is configured to receive requests from the PPEs 104 and to determine paths, through the interconnect network 200, via which the requests should be routed to appropriate accelerator engines 106 configured to perform processing operations specified by the requests. The first stage unit 300 is configured to then direct the requests via the selected paths though the interconnect network 200, in an embodiment. To select a path for a processing request, the first stage unit 300 first selects a VE instance 222, for the group of VE instances 222 configured to perform the processing operation specified by the request, in an embodiment. The first stage unit 300 then selects a path via which the route the request by selecting the path that leads to the accelerator engine 106 that includes the selected VE instance 222, in an embodiment.

In the embodiment illustrated in FIG. 3, the first stage unit 300 includes a plurality of input queues 302 coupled to a request processor 304, which, in turn, is coupled to a selector 306. In an embodiment, the input queues 302 correspond to respective links between the first stage unit 300 and the PPEs 104 (or the clusters of PPEs 104), and each of the queues 302 is configured to store requests received from a particular PPE 104 via the link between the first stage unit 300 and the PPE 104. The request processor 304 is configured to retrieve requests from the input queues 302 and to direct the requests to appropriate accelerated engines 106 configured to perform processing operations specified by the requests, in an embodiment.

In operation, the request processor 304 retrieves a request from a queue 302 and determines, for example based on an indication included in the request, the processing operation specified by the request. The request processor 304 then provides an indication of the specified processing operation type to the selector 306. The selector 306 receives the indication of the specified processing operation type, and selects a VE instance 222 from the group of VE instances 222 configured to perform processing operation of the type. In an embodiment, the selector 306 includes, or is coupled to, a lookup table (LUT) 312. In an embodiment, the LUT 312 stores associations between processing operations and VE instances 222 configured to perform the processing operations. When the path selector 306 receives an indication of a processing operation type from the request processor 304, the path selector 306 accesses the LUT 310 using the indication of the processing operation as an index the LUT 310 and retrieves, from the LUT 310, a list of candidate VE instances 222 for performing the processing operation, in an embodiment.

The selector 306 is coupled to an FC unit 312. The FC unit 312 implements flow control within the first stage unit 300, and also propagates flow control to the PPEs 104 coupled to the first stage unit 300, in an embodiment. In an embodiment, the FC unit 312 generates respective weights corresponding to VE instances 222 and provides the weights to the selector 306. The selector 306 then selects a particular VE instance to which to route the request based on the VE instance weights. In an embodiment, the FC unit 312 generates the weights at least in part based on the number of requests for which the VE instances were selected by the path selector 306. To this end, in an embodiment, the FC unit 312 includes a plurality of counters 314, each counter 314 corresponding to a particular VE instance 222. When the selector 306 makes a VE instance selection for a request, the selector 306 provides an indication of the selected VE instance 222 to the FC unit 312. The FC unit 312 updates (e.g., increments) a counter 314 corresponding to the VE instance 222 to account for the number of requests for which the VE instance 222 was selected by the selector 306, in an embodiment. Subsequently, when the request is transmitted from the first stage unit 300 to the second stage unit 216 coupled to the selected VE instance 222, the FC unit 312 decrements the counter 314 corresponding to the VE instance 222, in an embodiment.

In an embodiment, the FC unit 312 is configured to receive uplink flow control (UL FC) information 315 from the second stage units 216, and to generate the weights further based on the UL FC information 315. The UL FC information 315 includes VE instance flow control information and link flow control information. VE instance flow control information corresponding to a VE instance 222 is indicative of overall load experienced by the VE instance 222 due to requests sent to the VE instance by all of the first stage units 214, in an embodiment. In an embodiment, VE instance flow control information corresponding to a VE instance 222 indicates one of four possible load states of the VE instance 222, including an "on" state, a "light load" state, a "heavy load" state, and a "blocked" state. Link flow control information corresponding to a VE instance 222 indicates level of congestion on the link between the first stage units 300 and the second stage unit 216 coupled to the VE instance 222, in an embodiment. For example, link flow control information indicates the level of congestion on a link based on fill level of an input queue, in the second stage unit 216, coupled to the link between the first stage units 300 and the second stage unit 216 coupled to the VE instance 222. Similar to the VE instance FC information, link FC information indicates one of several possible congestion states, including, for example, "on" state, a "light congestion" state, a "heavy congestion" state, and a "blocked" state, in an embodiment. In other embodiments, other suitable numbers of states and/or other suitable states are utilized. For example, link FC information indicates a particular state of a suitable number of states that is less than four state or greater than four states, in some embodiments.

In an embodiment, the FC unit 312 determines a weight for a VE instance based on one or more of (i) the number of requests for which the selector 306 has previously selected the VE instance, (ii) the flow control state of the VE instance, as indicated by the VE instance state information included in the UL FC information 315, (iii) the link flow control state of the link between the first stage unit 300 and the second stage unit 216 that is coupled to the VE instance, as indicated by the link FC information included in the UL FC information 315, and (iv) the bandwidth of the VE instance. In an embodiment, higher load of a VE instance, higher congestion of the link between the unit 300 and the second stage unit coupled to the VE instance, and/or lower bandwidth of the VE instance lead to a higher weight determined by the path selector 304 for the VE instance. Conversely, lower load of the VE instance, lower congestion of the link between the unit 300 and the second stage unit coupled to the VE instance, and/or higher bandwidth of the VE instance leads to a lower weight determined by the path selector 304 for the VE instance.

In an embodiment, when UL FC information indicates that one or more VE instances 222 and/or one or more of the respective links between the first stage unit 300 and second stage units 216 coupled to the VE instances 222 are in the blocked state, then the FC unit 312 eliminates these VE instances 222 from consideration. The FC unit 312 then generates respective weights for the remaining VE instances 222, and provides the weights of the remaining VE instances 222 to the selector 306. The selector 306 then selects a VE instance 222, based on the weights, from the candidate VE instances in the remaining VE instances 222, in an embodiment. For example, the selector 306 selects the candidate VE instance having the "best" (e.g., the lowest, in an embodiment) weight. In an embodiment, if multiple ones of the candidate VE instances have the best weight, then the selector 306 applies a suitable selection algorithm for selecting a particular VE instance from the multiple candidate VE instances having the best weight. For example, the path selector 304 selects a VE instance randomly from the multiple ones of the candidate VE instances having the best weight.

Upon selecting a VE instance 222 corresponding to a request, the selector 306 provides an indication of the selected VE instance to the request processor 304. The request processor 304 associates the request with the selected VE instance, and directs the request to the selected VE instance for performing the processing operation requested by the request. In an embodiment, to associate the selected VE instance with the request, the request processor 304 generates a fabric header for the request, and includes the indication of the selected VE instance in the fabric header. For example, the request processor 304 includes the VE instance indication in a "target VE" field of the fabric header. In an embodiment, to forward the request to the selected VE instance, the request processor 304 maps the selected VE instance to an output port of the first stage unit 300 coupled to the second stage unit 214 that is coupled to the accelerator engine 106 that includes the selected VE instance. Then, the request processor 304 sends the request, and the fabric header generated for the request, to the output port for transmission of the request and the fabric header generated for the request to the second stage unit 216.

In some embodiments and/or scenarios, the request processor 304 fragments at least some of the requests, such as relatively longer requests, prior to forwarding of the requests to the VE instance 222 selected for the requests. In such embodiments and/or scenarios, the request processor 304 generates respective fabric headers for each fragment of a request, and sends each fragment, along with the fabric header generated for the fragment, to the output port for transmission of the fragment and the fabric header generated for the fragment to the second stage unit 216 coupled to the accelerator engine 106 that includes the VE instance selected for the request.

In an embodiment, the FC unit 312 is also configured to generate downlink (DL) FC information 316 to be transmitted to the PPEs 104. The DL FC information 316 includes accelerator engine state information and link state information. Accelerator engine state information is indicative of overall load of VE instances 222 configured to perform particular processing operations. For example, when all of VE instances configured to perform a particular processing operation are in blocked state, as indicated by DL FC information 316, the accelerator engine state information indicates that accelerator engines 106 that are configured to perform the processing operation are currently unavailable for performing the processing operation, in an embodiment.

Link state FC information is indicative of link congestion on respective links between the first state unit 300 and the PPEs 104. In an embodiment, congestion on a link is measured by fill level of the input queue 302 coupled to the link. In an embodiment, the FC unit 312 is configured to monitor fill level of the input queues 302. For example, the FC unit 312 is configured to obtain fill levels of the input queues 302 and to compare the fill levels to a high fill level threshold. When the fill level of an input queue 302 exceeds the high fill level threshold, the FC unit 312 generates the DL FC information 316 to indicate high input queue fill level of the input queue 302. Subsequently, when fill level of the input queue 302 drops (e.g., drops below the high fill threshold or below another threshold, such as a low fill threshold), the FC unit 312 generates the FC information to indicate the drop in fill level of the queue 302.

In an embodiment, the first stage unit 300 transmits the DL FC information 316 generated by the FC unit 312 to the PPEs 104 coupled to the first stage unit 300. For example, the first stage unit 300 generates an FC message that includes the DL FC information 316, and broadcasts the FC message to the PPEs 104, in an embodiment. In an embodiment, the first stage unit 300 periodically generates an FC message based on the most current FC information 316, and periodically broadcasts the FC message to the PPEs 104. In response to receiving FC information 316 from the first stage unit 300, the PPEs 104 adjust transmission of requests to the first stage unit 300, in an embodiment. For example, when FC information 316 includes an indication that the accelerator engines 106 are temporarily unavailable for performing a particular processing operation, the PPEs 104 temporarily stop sending requests that request the particular processing operation to the first stage unit 300. Subsequently, when FC information 316 indicates that the accelerator engines 106 are again available for performing the particular processing operation, the PPEs 104 resume sending requests for the particular processing operation to the first stage unit 300. Similarly, in response to receiving the link FC information indicating that a link between the first stage unit 300 and a particular PPE 104 is blocked or highly congested, the particular PPE 104 temporarily stops sending requests to the first stage unit 300, or reduces the rate of transmission of requests to the first stage unit 300, in an embodiment. Consequently, when the link state information indicates that congestion on the link has dropped, the PPE 104 resumes sending requests via the link to the first stage unit 300, or increases the rate of transmission of requests via the link to the first stage unit 300, in an embodiment.

Figure 4:
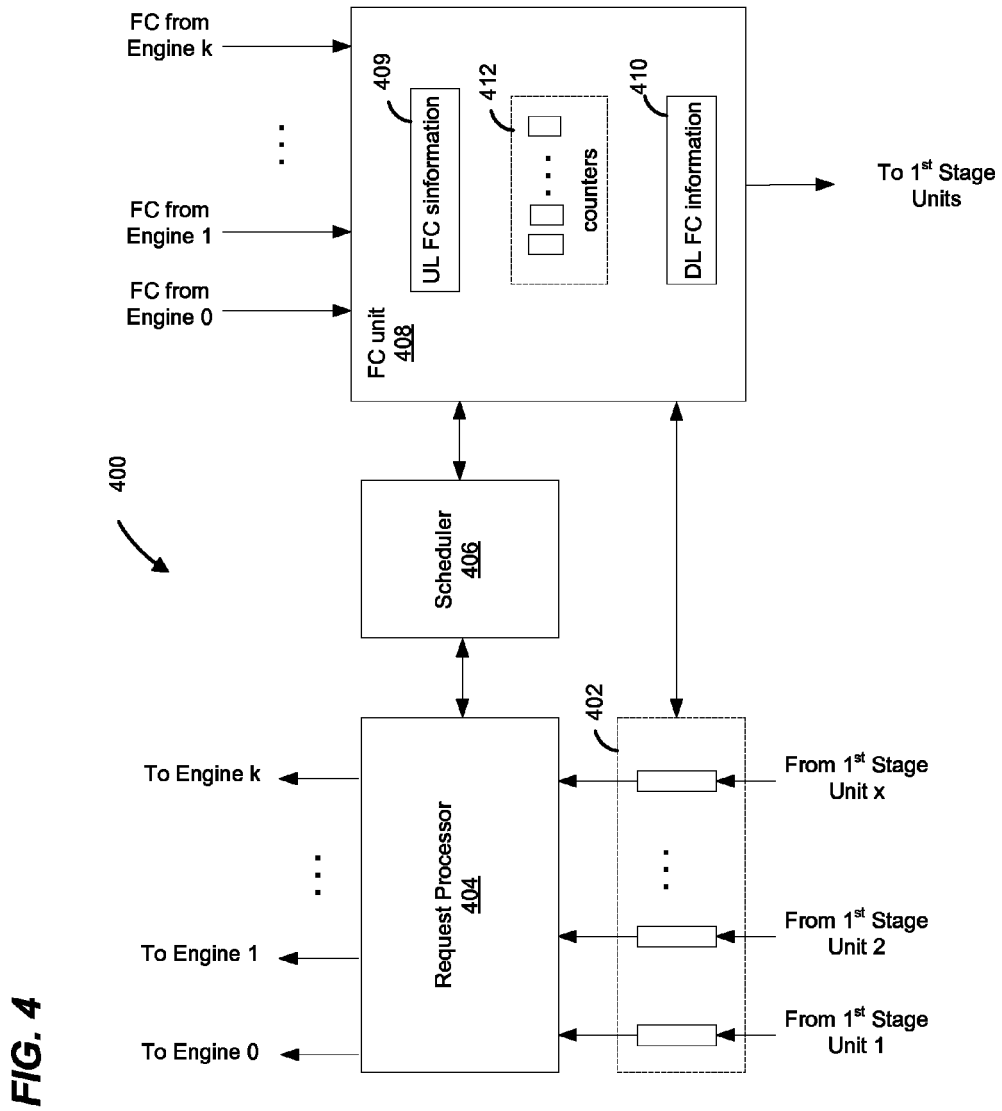
FIG. 4 is a block diagram of an example second stage unit suitable for use as a second stage unit in the interconnect network of FIG. 2, according to an embodiment.

FIG. 4 is a block diagram of a second stage unit 400 suitable for use as each of the second stage units 216 of FIG. 2 or each of the second stage units 124 of FIG. 1, according to an embodiment. For illustrative purposes, the example second stage unit 400 is described below in conjunction with FIG. 2. In other embodiments, however, the second stage unit 400 is utilized in interconnect networks other than the interconnect network 200 of FIG. 2. Similarly, the interconnect network 200 of FIG. 2 includes second stage units configured in suitable manners other than the second stage unit 400, in some embodiments.

The second stage unit 400 includes a plurality of input queues 402 coupled to a request processor 404. In an embodiment, the queues 402 correspond to respective links between the second stage unit 400 and the first stage units 214, and each of the queues 402 is configured to store requests received from a particular first stage units 214 via the link between the second stage unit 400 and the first stage units 214. The request processor 404 is configured retrieve the requests from the queues 402 and to schedule transmission of the requests to the accelerator engines 106, in an embodiment.

In an embodiment, the request processor 404 is configured to retrieve a request from a queue 402 and to determine the target VE instance 222 of the request, for example based on a target VE indication in a fabric header included with the request. The request processor 404 then provides an indication of the target VE instance to the scheduler 406. The scheduler 406 schedules transmission of the request to the accelerator engine 106 that includes the target VE, in an embodiment. The request processor 402 then maps the accelerator engine 106 to an output port of the second stage unit 400 that is coupled to the accelerator engine 106, and send the request to the out port for subsequent transmission of the request to the accelerator engine 106. In an embodiment, prior to transmitting the request to the target VE, the request processor 404 determines, based on an indication in the fabric header of the request, whether the request corresponds to a fragmented request transmitted from the first stage unit 214 as a plurality of fragments, or a single fragment request transmitted from the first stage unit 214 as a single fragment. If the request processor 404 determines that the request corresponds to a fragmented request, then the scheduler 404, in an embodiment, reassembles the request from the plurality of fragments corresponding to the request, and then transmits the reassembled request to the accelerator engine 106 that includes the target VE, in an embodiment. In another embodiment, the scheduler 404 does not reassemble the request from a plurality of segments, but rather transmits the request as the plurality of segments. In an embodiment, also prior to transmitting the request, the request processor 404 removes the fabric header from the request.

In an embodiment, the scheduler 406 is coupled to an FC unit 408. The FC unit 408 is configured to receive UL FC information 409 from the accelerator engines 106 coupled to the second stage unit 400. UL FC information includes link state information indicative of congestion on respective links between the second stage unit 400 and the accelerator engines 106, in an embodiment. For example, link state information included in the UL FC information 409 is indicative of fill level of input queues of the accelerator engines 106. In an embodiment, the link state information indicates one of several possible congestion states, including, for example, "on" state, a "light congestion" state, a "heavy congestion" state, and a "blocked" state, in an embodiment. In other embodiments, other suitable numbers of states and/or other suitable states are utilized. For example, link FC information indicates a particular state of a suitable number of states that is less than four state or greater than four states, in some embodiments. The FC unit 408 is configured to provide link state information to the scheduler 406. The scheduler 406 is configured to adjust scheduling transmission of requests to the accelerator engine 106 based on the link state information received from the FC unit 408, in an embodiment. For example, when link state information indicates that a link is in the heavy congested state or is in a blocked state, the scheduler 406 reduces the rate of scheduling requests to the accelerator engine 106 coupled to the link, or temporarily stops scheduling requests to the accelerator engine 106 coupled to the link, in an embodiments. Requests that temporarily cannot be scheduled for transmission to an accelerator 106, such as dues to heavily congested or blocked link between the second stage unit 400 and the accelerator engine 106 are stored in an buffer (not shown) in the second stage unit 400, in an embodiment. Subsequently, when link state information received from the accelerator engine 106 indicates a change in the state of the link (e.g., to "on" state or "lightly congested" state), the scheduler 406 begins scheduling the buffered requests to be transmitted to the accelerator engine 106, in an embodiment.

In an embodiment, the FC unit 408 is also configured to generate DL FC information 410 to be transmitted to the first stage units 214. In an embodiment, the DL FC information 410 corresponds to the UL FC information 315 of FIG. 3. The DL FC information 410 includes VE instance state information and link state information, in an embodiment. The VE instance state information included in the DL FC state information 410 is indicative of load of the VE instances 222 coupled to the second stage unit 400, in an embodiment. For example, VE instance state information corresponding to a VE instance is based on the number of requests that second unit 400 has sent to the VE instance, in an embodiment. For example, the FC unit 408 is configured to count the number of requests that the scheduler 406 schedules for each VE instance, and to generate the VE instance state information based on the number of requests scheduled for each VE instance. For this purpose, in an embodiment, the FC unit 408 includes a plurality of counters 412, each counter 410 corresponding to a particular VE instance 222. Each time the scheduler 406 schedules a request for transmission to a VE instance 222, the FC unit 408 increments the counter 410 corresponding to the VE instance 222. Subsequently, when the request is transmitted from the second stage unit 400 to the accelerator engine 106 that includes the VE instance 222, the FC unit 408 decrements the counter 410 corresponding to the VE instance 222, in an embodiment. In an embodiment, the FC unit 408 generates the VE instance FC state information based on the values of the counters 412. For example, based on the values of the counters 412, the FC unit 408 generates VE instance FC information that, in the example, indicates one of four states for each of the VE instances 222 coupled to the second stage unit 400, including an "on" state, a "light load" state, a "heavy load" state, and an "off" state.

Link state FC information included in the DL FC information 410 is indicative of link congestion on respective links between the second stage unit 400 and the first stage units 214. In an embodiment, congestion on a link between the second stage unit 400 and a first stage unit 214 is measured by fill level of the input queue 402 coupled to the link. In an embodiment, the FC unit 408 is configured to monitor fill level of the input queues 402. For example, the FC unit 408 is configured to obtain fill levels of the input queues 402 and to compare the fill levels to a high fill threshold. When the fill level of an input queue 402 exceeds the high fill threshold, the FC unit 408 generates the FC information to indicate high input queue fill level of the input queue 402. Subsequently, when fill level of the input queue 402 drops (e.g., drops below the fill threshold or below another threshold, such as a low fill threshold), the FC unit 408 generates the FC information to indicate the drop in fill level of the queue 302, in an embodiment.

The second stage unit 400 transmits the DL FC information 410 to the first stage units 214, in an embodiment. The first stage units 214 use the DL FC information 410 to adjust selection of VE instances for requests that the first stage units 214 subsequently receive from the PPEs 104, as discussed in more detail above with respect to FIG. 3, in an embodiment.

Figure 5:
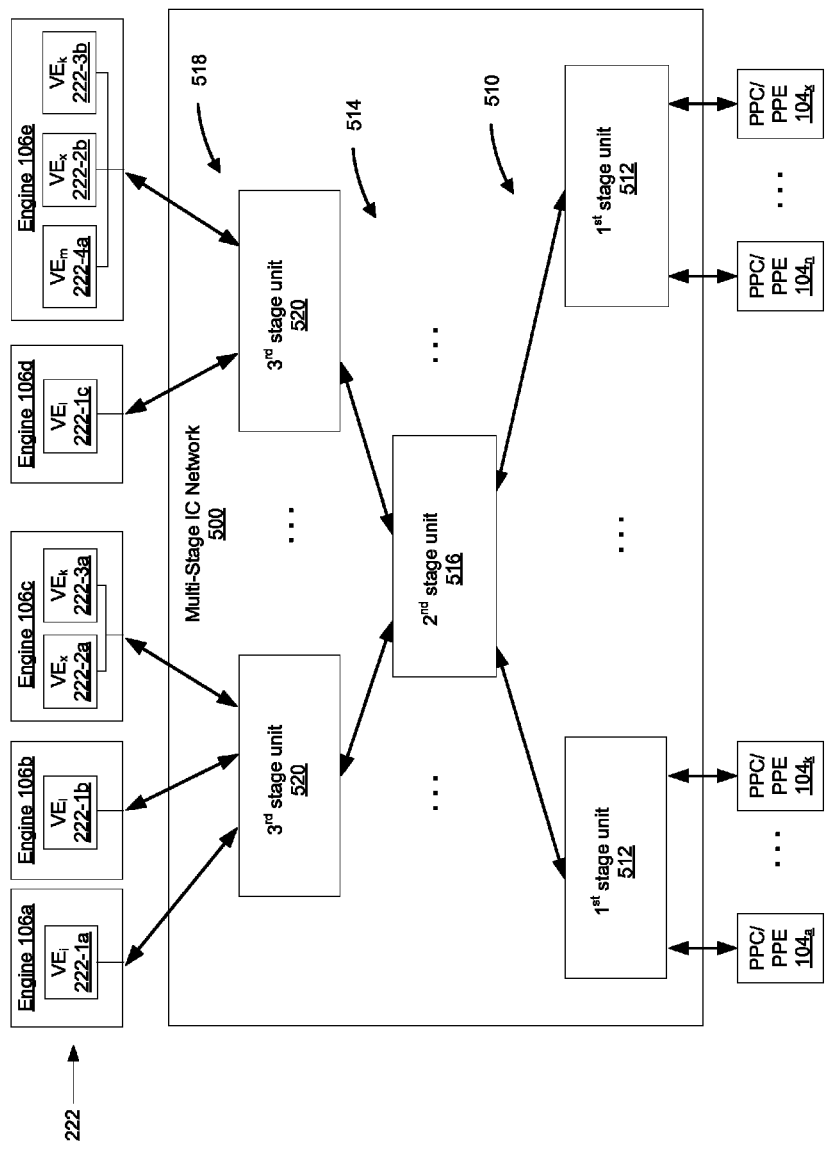
FIG. 5 is a block diagram of a multi-stage interconnect network suitable for use with the network device of FIG. 1, according to another embodiment.

FIG. 5 is a block diagram of an interconnect network 500 suitable for use as the interconnect network 108 of FIG. 1, according to another embodiment. The interconnect network 500 is similar to the interconnect network 200 of FIG. 2, except that the interconnect network 500 includes three interconnect stages compared to the two interconnect stages included in the interconnect network 200 of FIG. 2. In particular, the interconnect network 500 includes a first interconnect stage 510 that includes one or more first state units 512, a second interconnect stage 514 that includes one or more second stage units 516 and a third interconnect stage 518 that includes one or more third stage units 520. In an embodiment, the first interconnect stage 510 is an ingress interconnect stage of the interconnect network 500. The first stage units 512 are coupled to the PPEs 104 and to the second stage units 516. The first stage units 512 are configured to receive requests from the PPEs 104 and to forward the requests to the second stage units 516. The second interconnect stage 514 is an intermediate interconnect stage of the interconnect network 500. The second stage units 516 are coupled to the first stage units 512 and to the third stage units 520. The second stage units 514 are configured to receive requests from the first stage units 512 and to forward the request to the third stage units 520. The third interconnect stage 518 is an egress interconnect stage of the interconnect network 500. The third stage units 520 are coupled to the second stage units 516 and to the accelerator engines 106. The third stage units 520 are configured to receive requests from the second stage units 516 and to forward the request to the accelerator engines 106.

In an embodiment, each first stage unit 512 is configured to select second stage units to which to transmit requests in an attempt to uniformly distribute the requests among the second stage units 516. For example, a first stage unit 512 selects a second stage unit 216 to which to forward a request based on link states of respective links between the first stage unit 512 and the second stage units 516. Link state of a link reflects the amount of data (e.g., the number of requests and/or the length of each request) that the first stage unit 512 has previously sent to the second stage unit 516 coupled to the link, in an embodiment. A first stage unit 512 is configured to select, for each request, a link associated with the least amount of data previously sent via the link as indicated by the link state of the link. The first stage unit 512 is configured to then transmit the request via the selected link, and update link state of the selected link with the length of the request transmitted via the link, in an embodiment.

The second stage units 516 are configured receive requests from to select the accelerator engines 106, among a group of candidate accelerator engines 106 configured to perform the processing operations requests by the requests. In an embodiment, the second stage unit 516 of the second interconnect stage 514 are similar to the first stage units 214 of the interconnect network 200. In an embodiment, each second stage unit 516 is the same as or similar to the first stage unit 300 of FIG. 3. The third stage units 520 are configured to receive requests from the second stage units 520 and to schedule the requests for transmission to the accelerator engines 106 selected by the second stage units 520. In an embodiment, the third stage units 512 are the same as or similar to the second stage units 216 of FIG. 2. In an embodiment, each third stage unit 520 is the same as or similar to the second stage unit 400 of FIG. 4.

Referring to FIG. 2 and FIG. 5, the interconnect network 200 and the interconnect network 500 are easily scalable to support higher numbers of PPEs 104 without increasing latency through the interconnect network 200 (or the interconnect network 500), in at least some embodiments. For example, the interconnect network 200 is scalded to support higher numbers of PPEs 104 by expanding functionality of each of the first stage units 214 to accept requests from a larger sunset of the PPEs 104, in an embodiment. Alternatively, in another embodiment, the number of first stage units is increased to support the additional PPEs 104, while functionality of each of the first stage units 214 remains the same. In this case, functionality of each the second stage units 216 is expanded to support the additional first stage units 214, in an embodiment. As another alternative, in other embodiments, the number of interconnect networks 200 (or the number of the interconnect networks 500) is increased to support the additional PPEs 104. In such embodiments, the accelerator engines 106 generally include at least two VE instances configured to perform each processing operation type so that at least one VE instance is available for each of the multiple interconnect networks 200 (or each of the multiple interconnect networks 500). In one such embodiment, VE instances 222 configured to perform particular processing operation types are symmetrically distributed among the multiple interconnect networks 200 (or the interconnect network 500).

Figure 6:
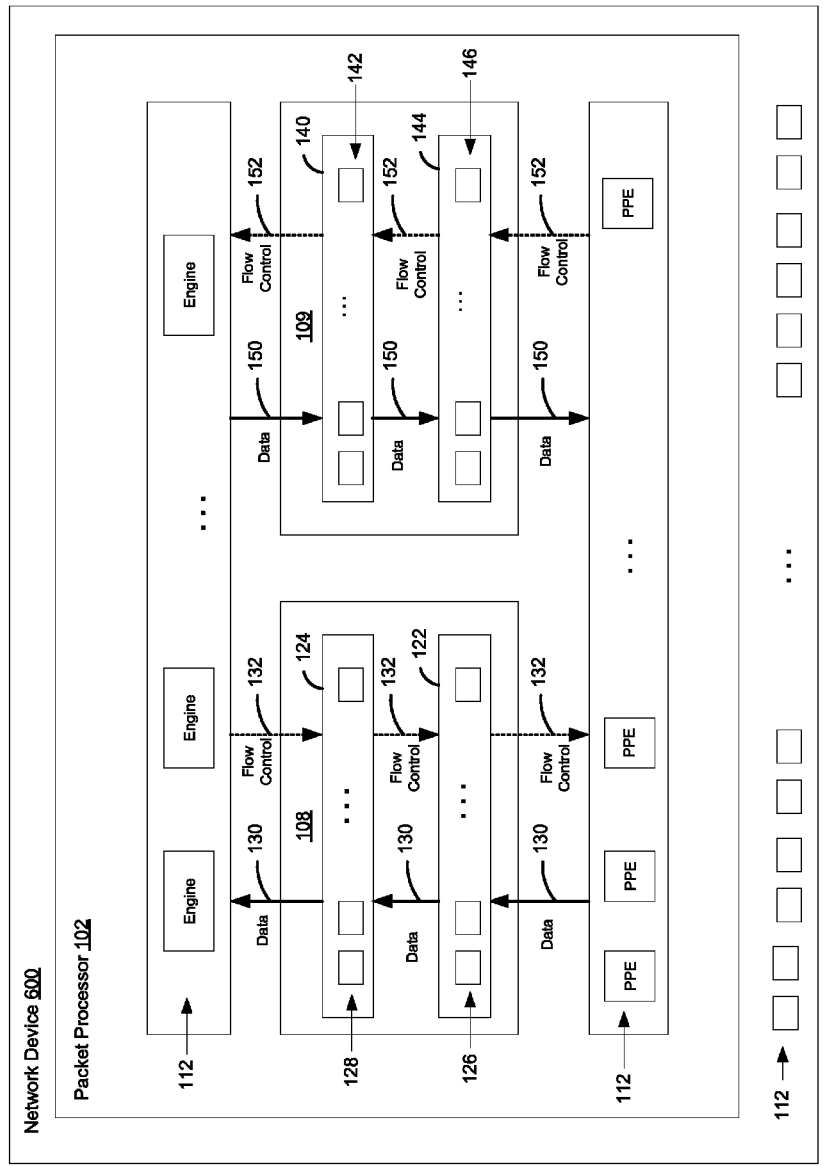
FIG. 6 is a block diagram of an example network device having separate forward path and reverse path multi-stage interconnect networks, according to an embodiment.

FIG. 6 is a block diagram of an example network device 600 having separate forward path and reverse path multistage interconnect networks, according to an embodiment. The network device 600 is generally similar to the network device 100 and includes like-numbered elements of the network device 100 which are not discussed for reasons of conciseness. In the network device 600, the interconnect network 108 (described above with respect to FIG. 1) is configured to provide a forward path for routing requests from the PPEs 104 to the accelerator engines 106. In addition, the network device 600 includes an interconnect network 109 configured to provide a reverse path for routing responses that include results of the requested processing operations from the accelerator engines 106 to the PPEs 104. It is noted, however, that in some embodiment the interconnect network 108 is configured to provide both forward paths from the PPEs 104 to the accelerator engines 16 and return paths from the accelerator engines 106 to the PPE 104. In such embodiments, functionality of the interconnect network 109, such as described below, is included in the interconnect network 108.

The interconnect network 109 is generally the same as or similar to the interconnect network 108, in an embodiment. For example, the interconnect network includes the same number of stages as the interconnect network 108, in an embodiment. However, the stages of the interconnect network 109 are reversed with respect to the stage of the interconnect network 108, in an embodiment. In the illustrated embodiment, the interconnect network 109 includes a first, or ingress, stage 140 which includes a plurality of first stage units 142 and a second, or egress, stage 144 which includes a plurality of second stage units 146. The first stage 140 of the interconnect network 109 generally corresponds to the second stage 124 of the interconnect network 108. In an embodiment, the first stage 140 of the interconnect network 109 includes the same number of first stage units 142 as the number of second stage units 124 of the second stage 128 of the interconnect network 108. In an embodiment, the first stage units 140 of the interconnect network 109 are coupled to the same respective subsets of accelerator engines 106 as the corresponding second stage units 128 of the interconnect network 108. In an embodiment, the second stage 144 of the interconnect network 109 generally corresponds to the first stage 222 of the interconnect network 108. In an embodiment, the second stage 144 of the interconnect network 109 includes the same number of second stage units 146 as the number of first stage units 126 of the interconnect network 108. In an embodiment, the second stage units 146 of the interconnect network 109 are coupled to the same respective subsets of PPEs 104 as the corresponding first stage units 126 of the interconnect network 108. Further, similar to the interconnect network 108, interconnect units of a particular stage of the interconnect network 109 are not coupled to and/or are not configured to route processing operation results to the other interconnect units of the particular stage of the interconnect network 109, in an embodiment.

Generally speaking, in an embodiment, the interconnect network 109 routes responses that include results of requested processing operations from the accelerator engines 106 that performed the processing operations to the PPE 104 that requested the processing operations. In an embodiment, the interconnect network 109 routes the responses that include results of processing operations via reverse paths that correspond to the forward paths via which the requests that requested the processing operation traversed the interconnect network 108 to reach the accelerator engines 106 that performed the processing operations.

In an embodiment, when the interconnect network 109 receives a response that includes a result of a processing operation, the interconnect network 109 determines a path via which to route the response to the PPE 104 that requested the processing operation. Because the response is routed to the particular PPE 104 that requested the processing operation, only one path is available to route the response through the interconnect network 109 to reach the particular PPE 104, at least in the case of a two-stage interconnect network, in an embodiment. In operation, according to an embodiment, a first stage unit 142 receives a response that includes the result of a processing operation. In an embodiment, the response includes, for example in a fabric header of the response, an indication of a PPE 104 that requested the processing operation. The first stage unit 142 determines which second stage unit 144 is coupled to the indicated PPE 104 that requested the processing operation. The first stage unit then transmits the response, in one or more fragments, to the determined second stage unit 144. The second stage unit 144 receives the response and, if the response was transmitted to the second stage unit 144 in multiple fragments, reassembles the result into a single fragment. The second stage unit 144 then transmits the response to the PPE 104 indicated in the fabric header of the response, in an embodiment. In an embodiment, prior to transmitting the response, the second stage unit 144 removes the fabric header from the response.

In an embodiment, the interconnect network 109 implements flow control similar to flow control implemented by the interconnect network 108. In an embodiment, FC information in the interconnect network 109, indicated in FIG. 6 by arrows 150, flows in the direction opposite to the direction of data flow (e.g., response flow) through the interconnect network 109, indicated in FIG. 6 by arrows 152. In an embodiment, FC information includes link state information indicative of congestion on links between the PPEs 104 and the second stage units 146, links between the second stage units 146 and the first stage units 142, and links between the first stage units 142 and the accelerator engines 106 is propagated through the interconnect network 109. In an embodiment, congestion on a link is measured by fill level of an input queue coupled to the link. For example, when fill level of an input queue coupled to a link exceeds a threshold, FC information corresponding to the link indicates a highly congested link state or a blocked link state, in an embodiment. The first stage units 142 and the second stage units 146 use FC information to adjust transmission of responses via the links, in an embodiment. For example, when a particular link is highly congested, the rate of transmission of responses via the link is reduced, in an embodiment. As another example, when FC information indicates that a particular link is blocked, responses are buffered in the first stage unit 142 or the second stage unit 146 that would otherwise transmit the responses via the link. Subsequently, when FC information corresponding to the link indicates a change in the state of the link, the buffered responses are transmitted via the link, in an embodiment.

Figure 7:
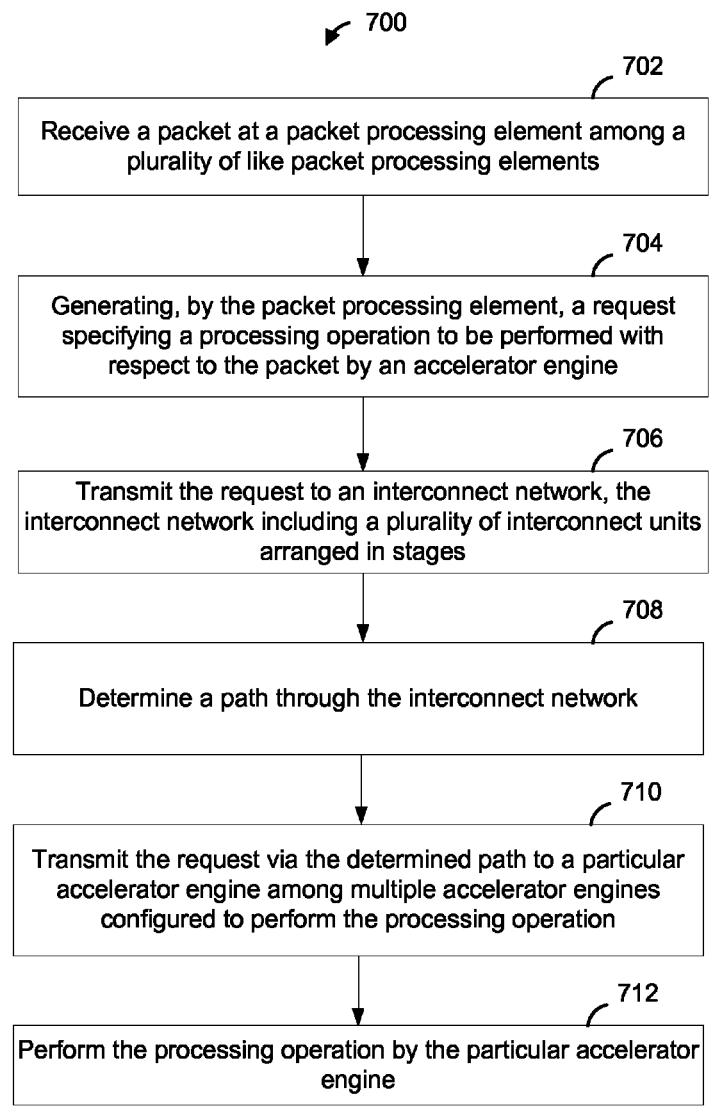
FIG. 7 is a flow diagram of an example method for routing requests through a multi-stage interconnect network, according to an embodiment.

FIG. 7 is a flow diagram of an example method 700 for routing requests through a multi-stage interconnect network, according to an embodiment. The method 700 is implemented by the network device 100 of FIG. 1, in an embodiment, and the method 700 is described with reference to FIG. 1 for illustrative purposes. In other embodiments, however, the method 700 is implemented by another suitable network device.

At block 702, a packet processing element 104 receives a packet to be processed by the packet processing element 104. At block 704, the packet processing element generates a request specifying a processing operation to be performed with respect to the packet by an accelerator engine 106, and at block 706, the packet processing element transmits the request to the interconnect network 108. More specifically, in an embodiment, at block 706, the packet processing element 104 transmits the request to a particular first stage unit 126 of the interconnect network 108.

At block 708, the interconnect network 108 determines a path through the network 108, among a plurality of candidate paths through the interconnect network 108, via which to route the request to an accelerator engine 106 that is configured to perform the specified processing operation. In an embodiment, no path of the plurality of candidate paths includes multiple interconnect units within a same stage of the interconnect network 108. In an embodiment, the particular first stage unit 126 to which the response is transmitted at block 706 determines the path via which to route the request through the network 108. For example, the first stage unit 126 selects a particular accelerator engine 106 among multiple accelerator engines 106 configured to perform the specified processing operation, and selects the path that leads to the selected particular accelerator engine 106. In an embodiment, the first stage unit 126 selects the particular accelerator engine 106 without communicating with the other first stage units 126. In an embodiment, the first stage unit 126 selects the particular accelerator 106 based at least in part on a number of requests that the first stage unit 126 has previously sent to respective candidate accelerator engines 106 configured to perform the processing operation. In an embodiment, the first stage unit 126 selects the particular accelerator engine further based on flow control information that the first stage unit 128 receives from respective second stage units 128.

At block 710, the interconnect network 108 routes the request via the determined path determined at block 708 to a particular accelerator engine 106 configured to perform the processing operation. At block 712, the particular accelerator engine 106 performs the processing operation.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium or media such as a magnetic disk, an optical disk, a RAM or ROM or flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method, comprising:
receiving a packet at a packet processing element, among a plurality of like packet processing elements, of a network device;
generating, by the packet processing element, a request specifying a processing operation to be performed with respect to the packet by an accelerator engine functionally different from the plurality of like packet processing elements;
transmitting the request from the packet processing element to an interconnect network, the interconnect network including a plurality of interconnect units arranged in stages;
determining a path through the interconnect network, wherein the path is selected among a plurality of candidate paths, wherein no path of the candidate paths includes multiple interconnect units within a same stage of the interconnect network;
transmitting the request, via the determined path, to a particular accelerator engine among multiple candidate accelerator engines configured to perform the processing operation; and
performing the processing operation by the particular accelerator engine.

2. The method of claim 1, wherein:
transmitting the request to the interconnect network comprises transmitting the request to a first interconnect unit of the plurality of interconnect units, wherein the first interconnect unit is in a first stage of the interconnect network, and
determining the path through the interconnect network includes selecting the particular accelerator engine by the first interconnect unit, wherein the particular accelerator engines is coupled to an interconnect unit in a second stage of the interconnect network.

3. The method of claim 2, wherein selecting the particular accelerator engine comprises selecting the particular accelerator engine based at least in part on a number of requests previously sent by the first interconnect unit to respective accelerator engines of the candidate accelerator engines.

4. The method of claim 3, further comprising:
generating, at respective second interconnect units, the second interconnect units in the second stage of the interconnect network, flow control information indicative of one or more of (i) respective loads of one or more candidate accelerator engines coupled to the respective second interconnect units and (ii) congestion on respective links between the first interconnect unit and the second interconnect units,
transmitting the flow control information from the second interconnect units to the first interconnect unit,
receiving the flow control information at the first interconnect unit, and
selecting the particular accelerator engine at the first interconnect unit further based on the received flow control information.

5. The method of claim 4, wherein generating the flow control information indicative of respective loads of one or more candidate accelerator engines coupled to the respective second interconnect units comprises generating the flow control information based on respective numbers of requests sent to the respective candidate accelerator engines by interconnect units in the first stage of the interconnect network.

6. The method of claim 4, wherein generating flow control information indicative of congestion on respective links between the first interconnect unit and the respective second interconnect units comprises generating the flow control information based on respective fill levels of input queues of the second interconnect units, the input queues coupled to the respective links between the first interconnect unit and the second interconnect unit.

7. The method of claim 6, wherein
the flow control information corresponding to the link indicates one or more states of the link including (i) on state, (ii) light congestion state, (iii) heavy congestion state, and (iv) blocked state, and
selecting the particular accelerator engine includes eliminating from consideration one or more candidate accelerator engines coupled to the second interconnect unit if the flow control information indicates that the link between the first interconnect unit and the second interconnect unit is in the blocked state.

8. The method of claim 4, wherein:
the flow control information corresponding to a candidate accelerator engine indicates one of four states including (i) on state, (ii) light load state, (iii) heavy loaded state, and (iv) blocked state, and
selecting the particular accelerator engine includes eliminating a candidate accelerator engine from consideration if the flow control information corresponding to the candidate accelerator engine indicates that the candidate accelerator engine is in the blocked state.

9. The method of claim 4, wherein the flow control information is first flow control information, the method further comprising:
generating, at the first interconnect unit, second flow control information based on first flow control information, wherein the second flow control information is indicative of overall load of the candidate accelerator engines,
transmitting the second flow control information from the first interconnect unit to packet processing elements coupled to the first interconnect unit,
receiving the second flow control information by the packet processing elements coupled to the first interconnect unit, and
adjusting transmission of requests by the packet processing elements to the first interconnect unit based on the second flow control information.

10. The method of claim 1, wherein selecting the particular accelerator engine comprises selecting the particular accelerator engine without communicating with the other interconnect units in the first stage.

11. A network device, comprising:
a plurality of packet processing elements configured to process packets received from a network, the packet processing elements configured to selectively engage accelerator engines for performing certain processing operations with respect to the packets;
a plurality of accelerator engines configured to perform certain processing operations not performed by the packet processing elements, wherein two or more accelerator engines are configured to perform a processing operation of a same type; and
a multi-stage interconnect network configured to route requests from the packet processing elements to the accelerator engines, the multi-stage interconnect network including at least two interconnect stages, the interconnect stages respectively including a plurality of interconnect units, wherein the interconnect units of a given stage are configured to route the requests to the interconnect units of neighboring stages and not to route the requests to the interconnect units of the given stage.

12. The apparatus of claim 11, wherein where each of at least some of the packet processing elements is configured to perform processing to completion of packets using computer readable instructions stored in a non-transitory memory.

13. The apparatus of claim 11, wherein the processing operations that the accelerator engines are configured to perform include one or more of (i) forwarding lookup operations, (ii) policy control lookup operations, and (iii) cyclic redundancy check calculations.

14. The apparatus of claim 11, wherein respective interconnect units of the first stage are coupled to respective subsets of packet processing elements of the plurality of packet processing elements, respective interconnect units of the second state are coupled to respective subsets of accelerator engines of the plurality accelerator engines, and the interconnect units in the first stage are coupled to the interconnect units in the second stage.

15. The apparatus of claim 14, wherein a first interconnect unit of the first stage is configured to
receive, from a packet processing element coupled to the first interconnect unit, a request specifying a particular processing operation,
select an accelerator engine among a group of candidate accelerator engines configured to perform the particular processing operation, and
transmit the request to a second interconnect unit in the second stage, the second interconnect unit coupled to the selected accelerator engine.

16. The apparatus of claim 15, wherein the first interconnect unit is configured to select the particular accelerator engine without communicating with the other interconnect units in the first stage.

17. The apparatus of claim 15, wherein the first interconnect unit is configured to select the particular accelerator engine based at least in part on a number of requests previously sent by the first interconnect unit to respective accelerator engines of the candidate accelerator engines.

18. The apparatus of claim 15, wherein respective second interconnect units in the second stage of the interconnect network are configured to generate flow control information indicative of one or more of (i) respective loads of one or more candidate accelerator engines coupled to the respective second interconnect units and (ii) congestion on respective links between the first interconnect unit and the second interconnect units, and
transmit the flow control information from the second interconnect units to the first interconnect unit.

19. The apparatus of claim 18, wherein the first interconnect unit is further configured to:
receive the flow control information from the respective second interconnect units, and
select the particular accelerator engine further based on the received flow control information.

20. The apparatus of claim 19, wherein the flow control information is first flow control information, and wherein the first interconnect unit is further configured to:
generate second flow control information based on the first flow control information, wherein the second flow control information is indicative of overall load of the candidate accelerator engines, and
transmit the second flow control information to packet processing elements coupled to the first interconnect unit.

* * * * *